Oct. 11, 1949.  G. H. MILLER ET AL  2,484,352

PULSE LENGTH DISCRIMINATOR

Filed March 26, 1946

*INVENTORS*
GLENN H. MILLER
BY JAMES A. KRUMHANSL

ATTORNEYS

Patented Oct. 11, 1949

2,484,352

UNITED STATES PATENT OFFICE 2,484,352

PULSE LENGTH DISCRIMINATOR

Glenn H. Miller, Rochester, and James A. Krumhansl, Penfield, N. Y., assignors to Stromberg-Carlson Company, a corporation of New York Application March 26, 1946, Serial No. 657,174

6 Claims. (Cl. 250—27)

This invention relates to a method for and apparatus for use in pulse communication systems and, more particularly, to pulse length discriminators for use in receiving means in such systems.

Pulse communication systems have been proposed in which pulses of substantially constant length are transmitted and received for the conveyance of intelligence and in which modulation causes the spacing between successive pulses to be varied.

It is an object of our invention to provide a method of an apparatus for pulse length discrimination which will reject all pulses, whether caused by a received signal or by interference, which are not of a predetermined length. In systems constructed in accordance with the principles of our invention bursts of interference energy, whether man-made or atmospheric, are substantially all eliminated.

Figure 2:
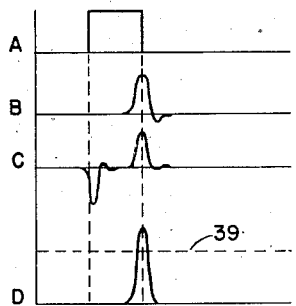
Figure 3:
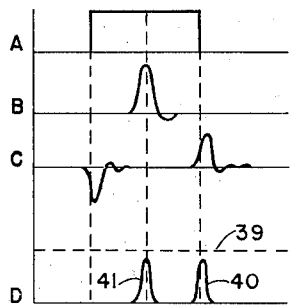
Figure 4:
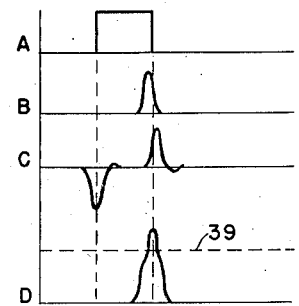

Further objects and advantages of our invention will become apparent as the following description proceeds. For a better understanding of our invention reference is made to the following description and to the accompanying drawing in which Fig. 1 is a schematic diagram illustrating one embodiment of a pulse length discriminator constructed in accordance with our invention and Figs. 2, 3, and 4 are charts useful in gaining an understanding of our invention.

In practicing our invention the received pulses appear at the input terminal 1 of the pulse length discriminator. Delay or wave-shaping means indicated by the numeral 2 is provided for producing a peaked pulse a predetermined time after the receipt of each of the received pulses. A second wave-shaping means which may be a differentiating and inverting circuit indicated generally by the numeral 3 is provided for producing a second pulse at the termination or end of each of the received or input pulses. Finally, there is provided comparison means such as the coincidence measuring circuit generally indicated by the numeral 4 for producing an output pulse, or, in other words, passing a received pulse, only when there is substantial coincidence in the time of occurrence of the pulses produced in the first and second wave-shaping means.

Figure 1:
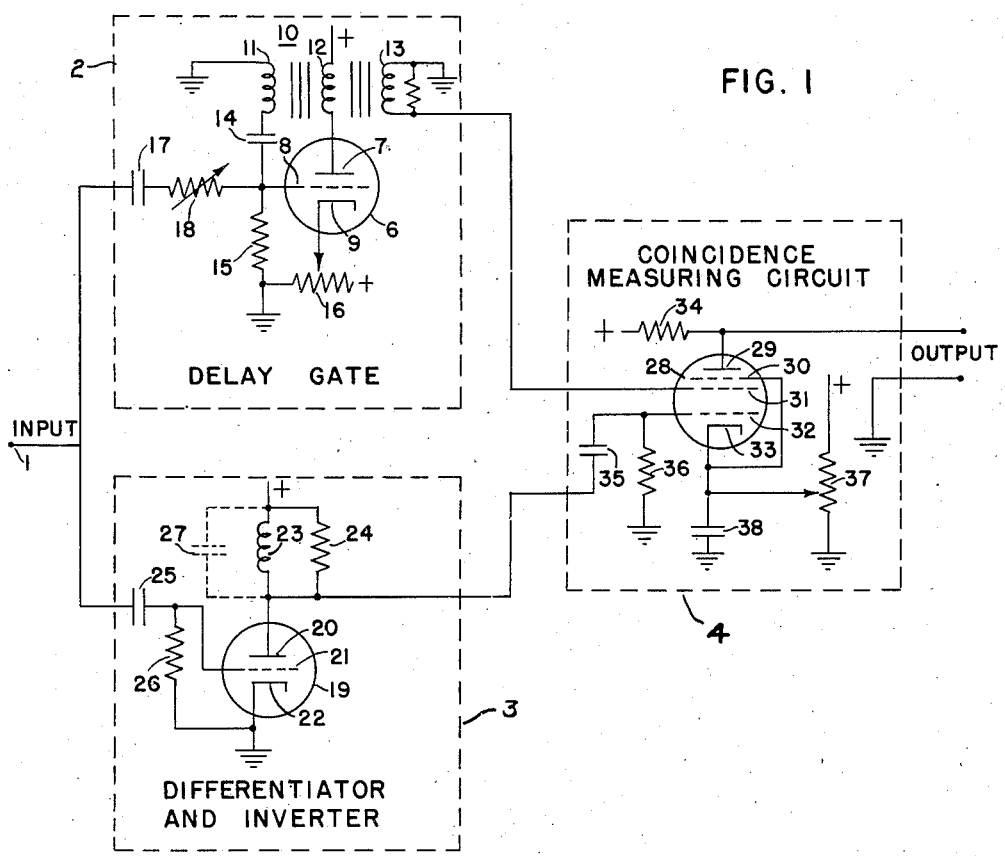

For a more detailed description of our invention reference is directed to Fig. 1. The delay circuit 2 in the illustrated form of our invention is a transformer coupled blocking oscillator comprising an electron discharge device 6 having an anode 7, a control electrode 8 and a cathode 9, and a transformer 10 having three windings 11, 12 and 13. The anode 7 is connected to a suitable source of positive potential through transformer winding 12. The control electrode or grid 8 is connected to a capacitor 14, and the other side of capacitor 14 is connected to one end of transformer winding 11, the other end of the transformer winding 11 being grounded. In order to provide a discharge path for condenser 14 a suitable resistance 15 is connected between control electrode 8 and ground. In order normally to bias discharge device 6 beyond cut-off, cathode 9 may be connected to the movable or adjustable arm of a potentiometer 16, the resistance portion being preferably connected between a suitable source of positive potential and ground. Transformer winding 13 constitutes the output circuit of the delay means 2.

In order to trigger or render operative the blocking oscillator to produce a positive-going relatively short pulse in output winding 13, the received or input pulses are impressed upon control electrode 8 through a suitable coupling condenser 17 and resistance 18 which is preferably of a variable type. The receipt of input pulses charges condenser 14 at a rate determined by the time constant of condenser 14 and resistance 18. Positive input pulses having sufficient amplitude will cause the discharge device 6 to conduct after a predetermined time determined by the resistance of resistor 18 and the capacitance of capacitor 14 (which is commonly expressed as the R.—C. or time constant of the blocking oscillator) and the cathode bias. Anode current resulting from conduction through the discharge device flows through the transformer winding 12 and sets up a magnetic field resulting in induced voltages in windings 11 and 13. The transformer windings are so disposed that windings 11 and 13 are inversely connected with respect to winding 12 so that if the upper end of winding 12 is at a positive potential, the induced voltage in the other windings 11 and 13 is positive at the lower ends thereof.

The induced voltage in the transformer winding 11 is impressed on the control electrode 8 through condenser 14 and tends to drive the control electrode more and more positive. When the anode current reaches saturation the magnetic field caused by current flowing in transformer winding 12 ceases to increase. As a result there is no induced voltage in the grid winding 11. If at this time there is no positive pulse on the control electrode, there is no charging potential applied to condenser 14 and the condenser begins to discharge through resistor 15 which causes a decrease in the potential at control electrode 8. The decrease in grid potential results in lower anode current and the field due to current flow in the plate transformer winding 12 decreases. The induced voltage in winding 11 decreases still more so that the control electrode is driven more and more negative until after a predetermined time the discharge device 6 is cut off. The next oscillation or pulse will occur only when the control electrode again becomes sufficiently positive to exceed cut-off on the arrival of a sufficiently positive pulse and recovery of capacitor 14 to a sufficiently positively charged condition. The time of rise and decay of plate or anode current is determined by the inductance and resistance of the transformer 10. Because of the before-mentioned arrangement of transformer windings a positive pulse appears at the ungrounded end of transformer winding 13 or in other words the positive pulse is produced by the delay means a predetermined time after the receipt of an input pulse.

The operation of delay means 2 may be better understood from a consideration of parts A and B of Figs. 2, 3 and 4. In Fig. 2—A there is shown a substantially rectangular input pulse. At 2—B there is depicted a typical pulse produced by the blocking oscillator with variable resistance 18 set to cause conduction of discharge device 6 at substantially the end of the received pulse. In Fig. 3—A there is illustrated an input pulse approximately twice the length of the input pulse shown at 2—A. Assuming that the variable resistances 16 and 18 have the same settings as under the conditions of Fig. 2, it will be understood that the blocking oscillator output pulse occurs after the same lapse of time as in Fig. 2. In other words the blocking oscillator produces a pulse approximately half-way through the duration of the input pulse. In Fig. 4 there is illustrated a condition in which the blocking oscillator pulse is produced just before termination of the received or input pulse.

If the received pulses are of insufficient duration, discharge device 6 is not rendered conductive and, hence, no output pulse is produced in the output winding 13 of the transformer 10 and, hence, no pulse is passed through the discriminator.

In order to prevent passing pulses through the discriminator when the input pulses are longer than the predetermined amount, there is provided the second wave-shaping means 3 which in the illustrated form of our invention serves to invert and differentiate the input pulses. The inverting and differentiating circuit 3 comprises a suitable electron discharge device 19 comprising an anode 20, a control electrode 21 and a cathode 22. The cathode 22 is preferably grounded. The anode 20 is connected to a suitable source of positive potential through a suitable inductance 23 shunted by a resistance 24. Received or input pulses are impressed upon the control electrode 21 by means of a coupling condenser 25 connected between the control electrode 21 and the input terminal 1. Suitable bias is provided by means of resistance 26 connected between control electrode 21 and cathode 22.

Inductance 23 and resistance 24 are chosen to provide a low Q resonant circuit so that relatively sharp and narrow peaks will appear in the output. The inductance 23 is tuned by its own distributed capacitance indicated by the numeral 27 and the resonant circuit is shunted by the resistance 24 of such value as to produce critical damping. The appearance of the positive input pulses on the control electrode 21 renders the discharge device conductive. The initial surge of anode-cathode current charges the distributed capacitance of the inductance 23 and a voltage of opposite polarity is developed across the resonant circuit since there must be produced a voltage opposing the rise of current through the inductance. At the termination of the input pulse, the discharge device 19 is cut off and the anode-cathode current drops to zero. The current flowing through the inductance cannot change instantaneously and hence begins to oscillate between the inductance of coil 23 and its distributed capacitance 27. The voltage induced across the inductance is of a polarity to oppose the decrease of anode current. Its amplitude is limited by the distributed capacitance and its rate of change is determined by the resonant frequency of the L.-C. circuit. By suitably choosing the value of the resistance 24 only one positive pulse occurs in the output and the time of occurrence of that pulse coincides with the termination of the input pulse. Thus, circuit means 3 produces a negative-going voltage corresponding to the positive-going received pulses, or negative-going images of the received pulses and produces a relatively short positive-going pulse at the termination of the negative-going voltage.

The coincidence circuit 4 is provided to compare the times of occurrence of the output pulses produced by the delay circuit 2 and the differentiating and inverting circuit 3. In the illustrated form of our invention the coincidence circuit comprises an electron discharge device 28 having an anode 29, a suppressor electrode 30, control electrodes 31 and 32, and cathode 33. The anode 29 is connected to a suitable source of positive potential through a suitable dropping resistance 34. The pulses produced by delay means 2 are impressed upon the control electrode 31. The inverted and differentiated pulses produced by the differentiating circuit 3 are impressed upon control electrode 32 through a suitable coupling capacitor 35. Partial bias for the discharge device 28 is obtained by connecting a suitable resistance 36 between the control electrode 32 and ground. The discharge device 28 is further biased beyond cut-off by connecting cathode 33 to the adjustable arm of a suitable potentiometer 37, the resistance portion of which is connected between a suitable source of positive potential and ground. By-pass condenser 38 is connected between cathode 33 and ground. The bias is so adjusted that only substantial coincidence of output pulses, wherein the combined potential is sufficient to overcome the bias, renders operative or conductive the discharge device 28. By providing variable bias for cathode 33, the threshold of discharge device 28 can be varied so that the discharge device is rendered conductive for a varying degree of overlap of the pulses being compared.

To further explain the operation of the differentiating and inverting means and the coincidence or comparison circuit, reference is made to Figs. 2, 3 and 4. The output of the differentiating and inverting circuit 3 is represented at C in each of these figures and the conditions existing in discharge device 28 are represented at D. The combined control electrode potential required to render conductive discharge device 28 is indicated by the dashed line 39 in Figs. 2, 3 and 4. In Fig. 2 the positive-going pulses produced by delay means 2 (Fig. 2B) and differentiating and inverting means 3 (Fig. 2C) coincide so that the combined control electrode potential is sufficient to cause conduction of discharge device 28. Under the conditions illustrated in Fig. 3 the differentiating and inverting circuit 3 produces a positive-going pulse represented by the numeral 40 much later in time than the pulse 41 produced by the delay circuit 2 and, hence, the discharge device 28 is not rendered conductive. Fig. 4 illustrates conditions in which there is a slight amount of overlap between the compared pulses. Inasmuch as the resultant effect of the control electrode potentials is greater than threshold, the device 28 is rendered conductive even though exact coincidence is not present. As explained heretofore adjustment of the resistance 37 will vary the threshold represented by the numeral 39 and the adjustment of the resistances 16 and 18 will vary the time of occurrence of the pulses produced by the blocking oscillator in delay means 2 and, hence, the amount of overlap.

It may be noted at this point that the "peaked" or "delayed" pulses are preferably of less time duration than the received pulses so that the discriminator will have completely passed or rejected each received pulse before receipt of the next pulse. Expressed differently, the received pulses may be said to have substantial time duration with respect to the pulses produced by the delay gate 2 and the differentiator and inverter 3, whereas the pulses produced by means 2 and 3 are relatively short as compared to the input pulses.

While we have shown and described a particular embodiment of our invention, it will be obvious to those skilled in the art that changes and modifications may be made without departing from our invention in its broader aspects and we, therefore, aim in the appended claims to cover all such changes and modifications as fall within the true spirit and scope of our invention.

What is claimed is:

1. In a pulse length discriminator, a blocking oscillator normally biased beyond cut-off, means utilizing input pulse signals of substantial duration for causing said oscillator to produce a relatively short pulse a predetermined time after the receipt of each input signal, a normally inoperative inverting and differentiating circuit, means utilizing said input signals for causing said inverting and differentiating circuit to produce a relatively short pulse of the same sense as said first-mentioned relatively short pulse at the termination of each of said input pulse signals, and circuit means for comparing the degree of coincidence of said pulses and producing an output pulse whenever the compared pulses have substantial coincidence.

2. In a pulse length discriminator, a blocking oscillator normally biased beyond cut-off, means utilizing input pulse signals of substantial duration for causing said oscillator to produce a relatively short pulse a predetermined time after the receipt of each input signal, a normally inoperative inverting and differentiating circuit, means utilizing said input signals for causing said inverting and differentiating circuit to produce a relatively short pulse of the same sense as said first-mentioned relatively short pulse at the termination of each of said input pulse signals, circuit means for comparing the degree of coincidence of said pulses and producing an output pulse whenever the compared pulses have substantial coincidence, and means for adjusting the times of occurrence of said first-mentioned pulses with respect to the time of receipt of said input signal pulses.

3. In a pulse length discriminator, a blocking oscillator normally biased beyond cut-off, means utilizing input pulse signals of substantial duration for causing said oscillator to produce a relatively short pulse a predetermined time after the receipt of each input signal, a normally inoperative inverting and differentiating circuit, means utilizing said input signals for causing said inverting and differentiating circuit to produce a relatively short pulse of the same sense as said first-mentioned relatively short pulse at the termination of each of said input pulse signals, circuit means for comparing the degree of coincidence of said pulses and producing an output pulse whenever the compared pulses have substantial coincidence, and means for adjusting the operating threshold of said comparing circuit means in order to control the degree of coincidence required to cause production of output pulses.

4. In receiving means for a pulse communication system, a pulse length discriminator comprising a blocking oscillator including a resistance-capacitance network and a normally nonconducting electron discharge device having an anode, a cathode, and a control electrode, one terminal of said network being connected to said control electrode, a source of positive-going input pulse signals, means utilizing said pulse signals for charging said condenser and rendering conductive said discharge device to produce a positive-going relatively short delayed pulse a predetermined time after application of said signals to said network, said time depending upon the time constant of said network, a normally inoperative shock-excited oscillator including an electron discharge device having an anode, a control electrode and a cathode, an inductance shunted by a resistance connected in the anode circuit thereof, means for impressing said input pulse signals on the last-mentioned control electrode for rendering operative the last-mentioned discharge device to produce a positive-going relatively short delayed pulse at the termination of each signal pulse, means for comparing the times of occurrence of said delayed pulses comprising an electron discharge device having an anode, a cathode, and a pair of control electrodes, means for impressing one of said delayed pulses on one of said control electrodes and the other of said delayed pulses on the other of said control electrodes, means for biasing said discharge device to a predetermined threshold which is substantially above the amplitude of either of said delayed pulses but below the combined excitation when substantial coincidence exists between said delayed pulses whereby said last-mentioned discharge device is rendered conductive only when a predetermined degree of coincidence exists.

5. In receiving means for a pulse communication system, a pulse length discriminator comprising a blocking oscillator including a network having resistance and capacitance and a normally non-conducting electron discharge device having an anode, a cathode, and a control electrode, one terminal of said network being connected to said control electrode, a source of positive-going input pulse signals, means utilizing said pulse signals for charging said condenser and rendering conductive said discharge device to produce a positive-going relatively short delayed pulse a predetermined time after application of said signals to said network said time depending upon the time constant of said network, a normally inoperative shock-excited oscillator including an electron discharge device having an anode, a control electrode and a cathode, an inductance shunted by a resistance connected in the anode circuit thereof, means for impressing said input pulse signals on the last-mentioned control electrode for rendering operative the last-mentioned discharge device to produce a positive-going relatively short delayed pulse at the termination of each signal pulse, means for comparing the times of occurrence of said delayed pulses comprising an electron discharge device having an anode, a cathode and a pair of control electrodes, means for impressing one of said delayed pulses on one of said control electrodes and the other of said delayed pulses on the other of said control electrodes, means for biasing said discharge device to a predetermined threshold which is substantially above the amplitude of either of said delayed pulses but below the combined excitation when substantial coincidence exists between said delayed pulses whereby said last-mentioned discharge device is rendered conductive only when a predetermined degree of coincidence exists, and means for adjusting the time constant of said R.-C. network.

6. In receiving means for a pulse communication system, a pulse length discriminator comprising a blocking oscillator including a network having resistance and capacitance and a normally non-conducting electron discharge device having an anode, a cathode, and a control electrode, one terminal of said network being connected to said control electrode, a source of positive-going input pulse signals, means utilizing said pulse signals for charging said condenser and rendering conductive said discharge device to produce a positive-going relatively short delayed pulse a predetermined time after application of said signals to said network said time depending upon the time constant of said network, a normally inoperative shock-excited oscillator including an electron discharge device having an anode, a control electrode and a cathode, an inductance shunted by a resistance connected in the anode circuit thereof, means for impressing said input pulse signals on the last-mentioned control electrode for rendering operative the last-mentioned discharge device to produce a positive-going relatively short delayed pulse at the termination of each signal pulse, means for comparing the times of occurrence of said delayed pulses comprising an electron discharge device having an anode, a cathode, and a pair of control electrodes, means for impressing one of said delayed pulses on one of said control electrodes and the other of said delayed pulses on the other of said control electrodes, means for biasing said discharge device to a predetermined threshold which is substantially above the amplitude of either of said delayed pulses but below the control electrode excitation when substantial coincidence exists between said delayed pulses whereby said last-mentioned discharge device is rendered conductive only when a predetermined degree of coincidence exists, and means for adjusting the level of said threshold in order to adjust the degree of coincidence required to cause conduction in said last-mentioned discharge device.

GLENN H. MILLER.
JAMES A. KRUMHANSL.

REFERENCES CITED

The following references are of record in the file of this patent:

UNITED STATES PATENTS

| Number | Name | Date |
|---|---|---|
| 2,359,447 | Seeley | Oct. 3, 1944 |
| 2,418,127 | Labin | Apr. 1, 1947 |

FOREIGN PATENTS

| Number | Country | Date |
|---|---|---|
| 528,192 | Great Britain | Oct. 24, 1940 |